(No Model.) 5 Sheets—Sheet 1.

T. E. J. SCHAIBLY.
GRIP TESTING MACHINE.

No. 459,022. Patented Sept. 8, 1891.

WITNESSES:
J. A. Criswell.
C. Sedgwick.

INVENTOR:
T. J. Schaibly
BY Munn & Co.
ATTORNEYS (No Model.) 5 Sheets—Sheet 2.

T. E. J. SCHAIBLY.
GRIP TESTING MACHINE.

No. 459,022. Patented Sept. 8, 1891.

WITNESSES:
INVENTOR:
T. E. J. Schaibly
BY Munn & Co
ATTORNEYS (No Model.) 5 Sheets—Sheet 3.

T. E. J. SCHAIBLY.
GRIP TESTING MACHINE.

No. 459,022. Patented Sept. 8, 1891.

WITNESSES:
J. A. O. Criswell
C. Sedgwick

INVENTOR:
T. E. J. Schaibly
BY Munn & Co.
ATTORNEYS (No Model.) 5 Sheets—Sheet 4.

T. E. J. SCHAIBLY.
GRIP TESTING MACHINE.

No. 459,022. Patented Sept. 8, 1891.

WITNESSES:
J. A. C. Criswell
C. Sedgwick

INVENTOR:
T. E. J. Schaibly
BY Munn & Co.
ATTORNEYS (No Model.) 5 Sheets—Sheet 5.
T. E. J. SCHAIBLY.
GRIP TESTING MACHINE.
No. 459,022. Patented Sept. 8, 1891.
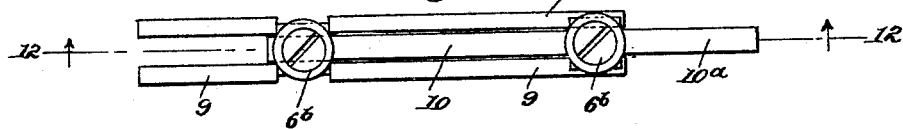
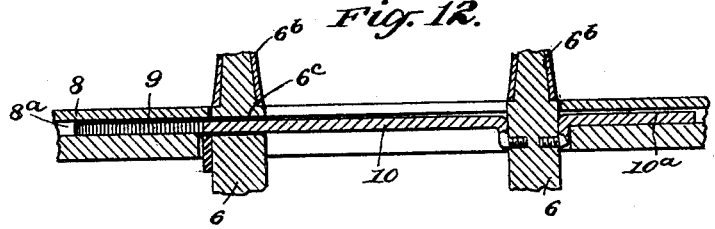
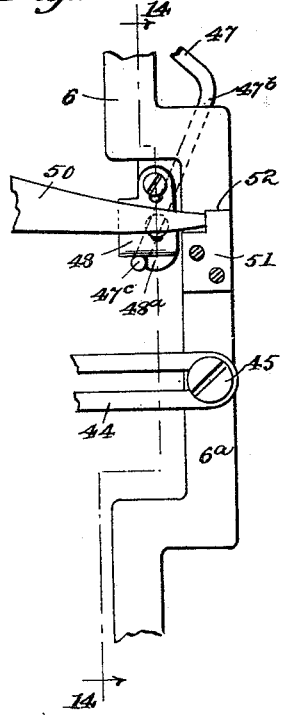
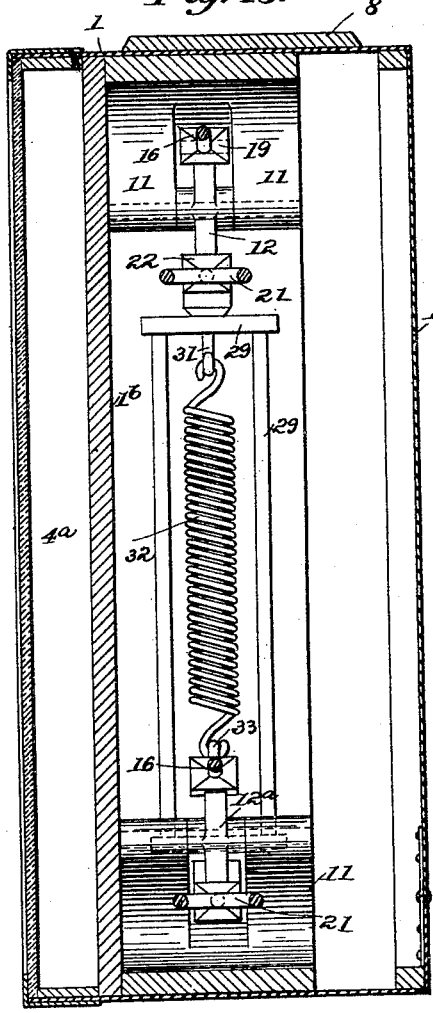
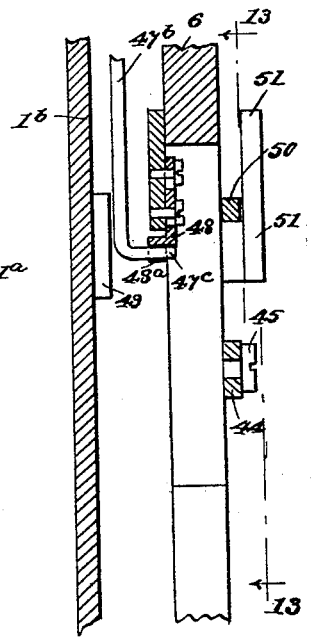
WITNESSES:
INVENTOR:
T. E. J. Schaibly
BY
Munn & Co.
ATTORNEYS

UNITED STATES PATENT OFFICE.

THEOBALD E. J. SCHAIBLY, OF BROOKLYN, NEW YORK.

GRIP-TESTING MACHINE.

SPECIFICATION forming part of Letters Patent No. 459,022, dated September 8, 1891.

Application filed August 18, 1890. Serial No. 362,304. (No model.)

*To all whom it may concern:*

Be it known that I, THEOBALD E. J. SCHAIBLY, of Brooklyn, in the county of Kings and State of New York, have invented a new and Improved Grip-Testing Machine, of which the following is a full, clear, and exact description.

My invention relates to improvements in that class of machines which are used to test the strength of one's grip, and in which the handle-levers are unlocked and the machine placed in position for operation by means of a coin dropped into a slot and operating upon suitable releasing mechanism.

The object of my invention is to produce a machine in which the handle-levers instead of swinging in the arc of a circle, as in the ordinary way, will move an equal distance at both ends, so that the strength of one's grip will thereby be more accurately tested, and a further object of my invention is to construct the machine in such a manner that the main levers cannot be operated by pushing or pulling, but only by being firmly gripped and forced together.

A further object of my invention is to construct the machine in such a manner that it will operate without springs, save the main registering-springs, and will therefore be easily kept in working order.

To this end my invention consists in certain features of construction and combinations of parts, which will be hereinafter fully described, and then pointed out in the claims.

Reference is to be had to the accompanying drawings, forming a part of this specification, in which similar letters of reference indicate corresponding parts in all the figures.

Figure 1:
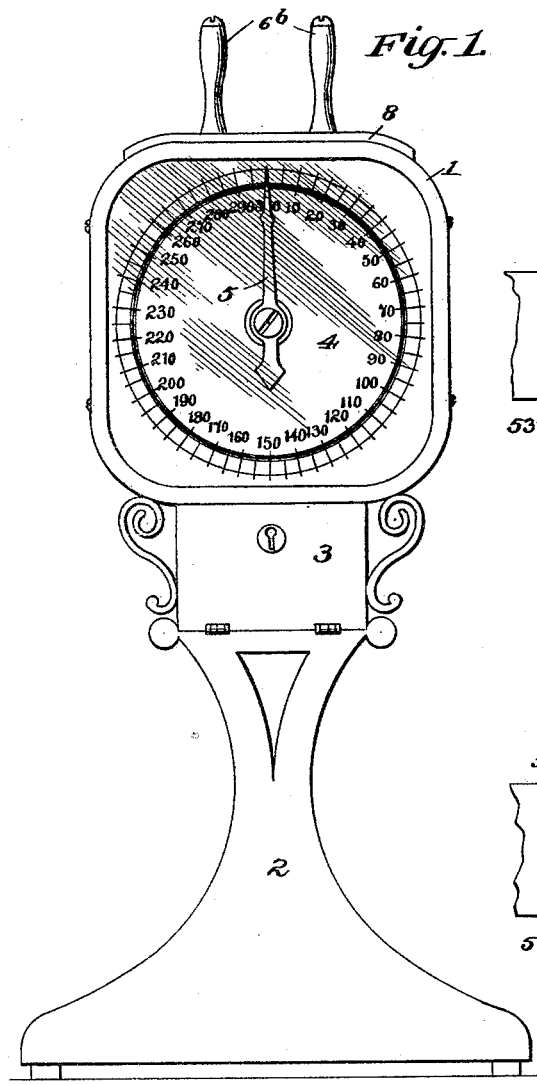
Figure 8:
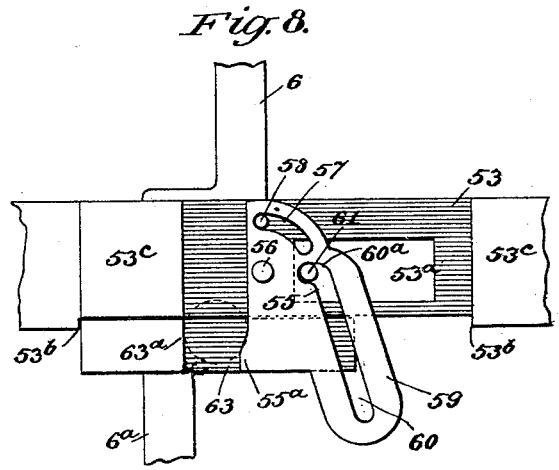
Figure 9:
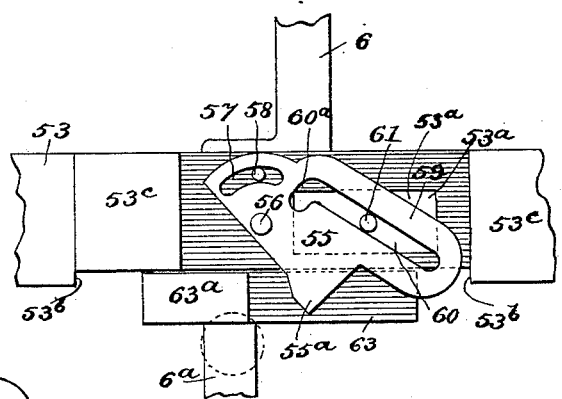
Figure 10:
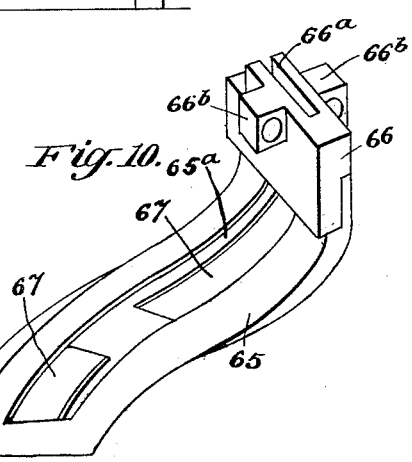
Figure 2:
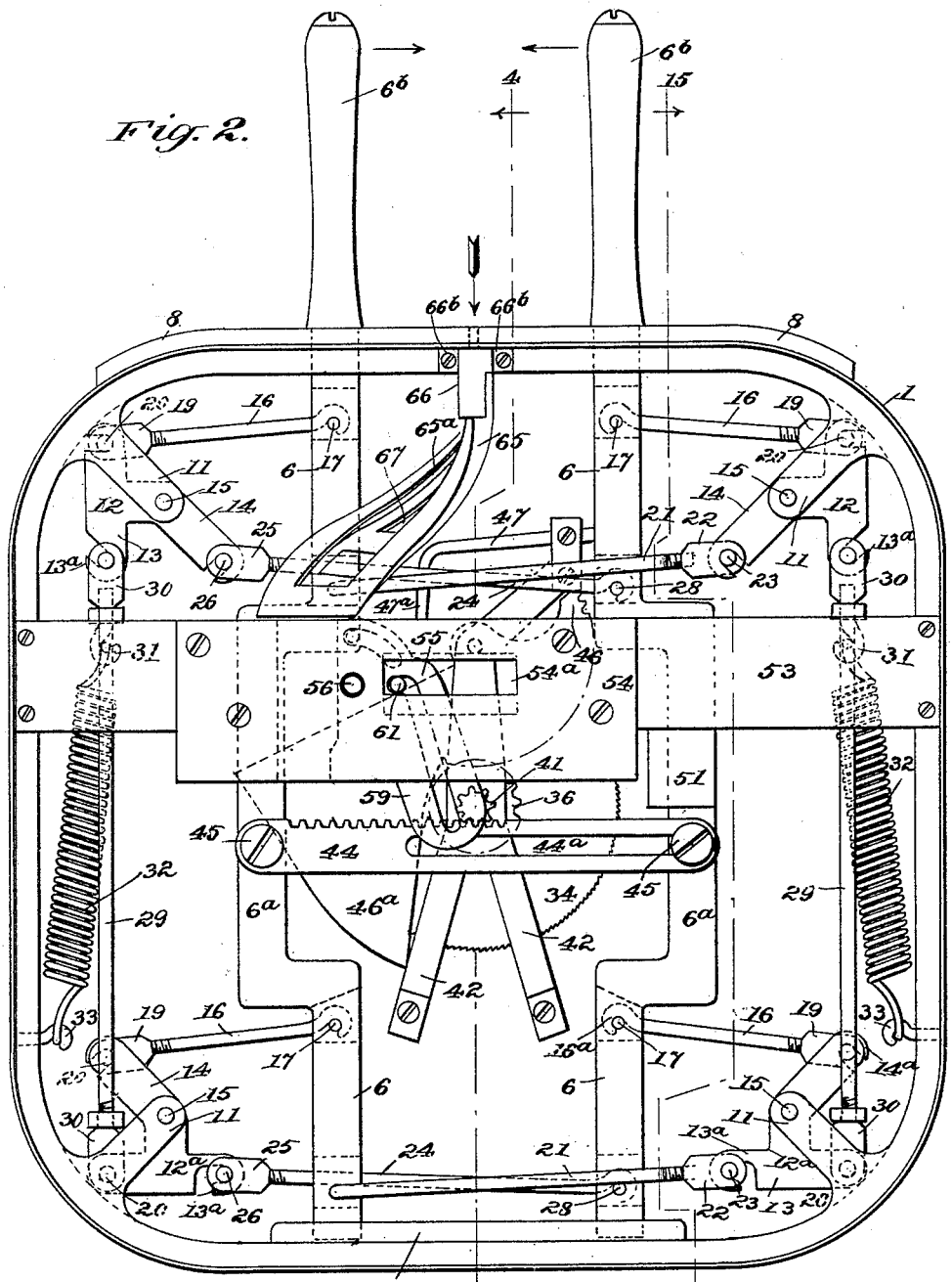
Figure 3:
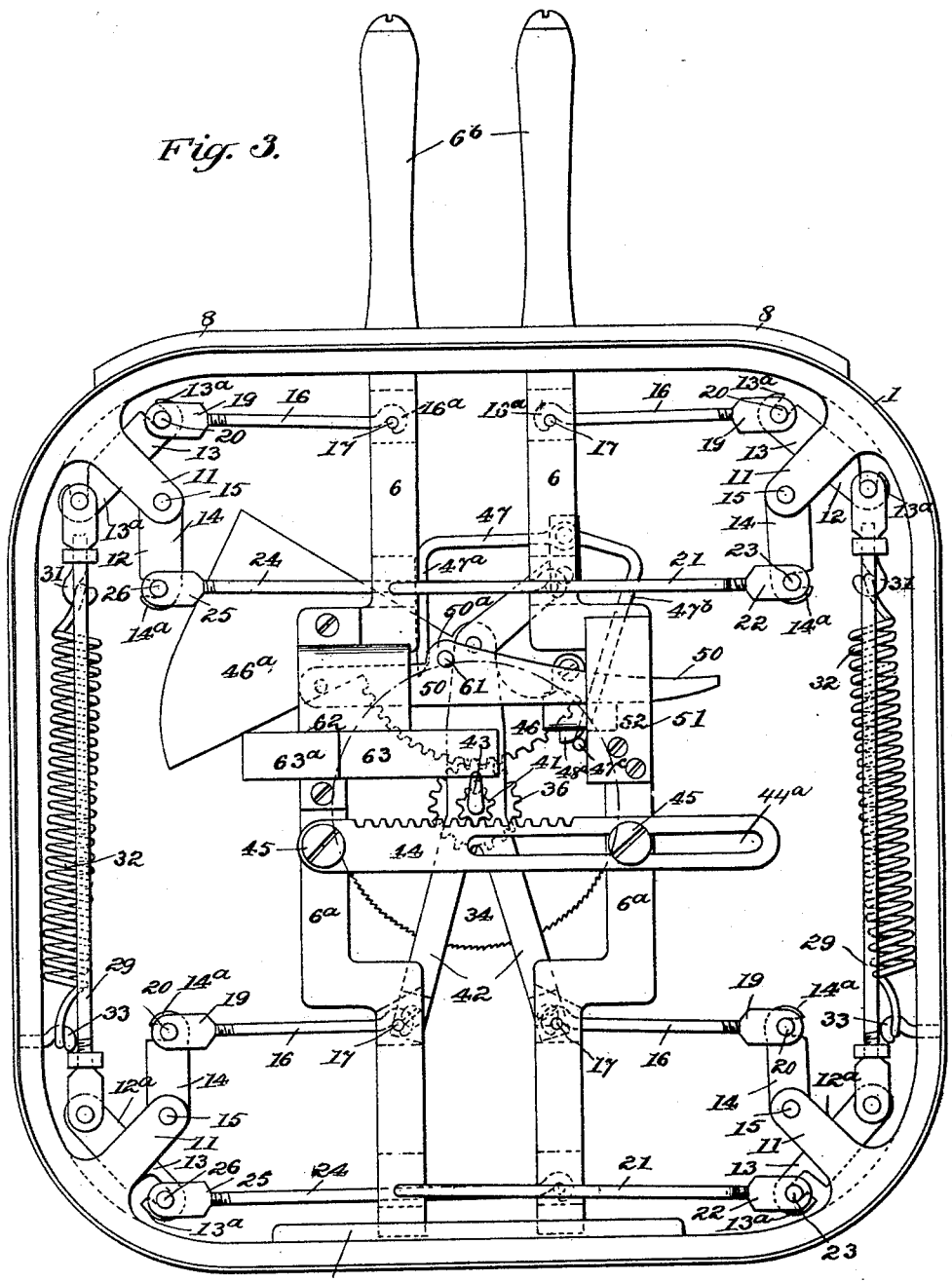
Figure 4:
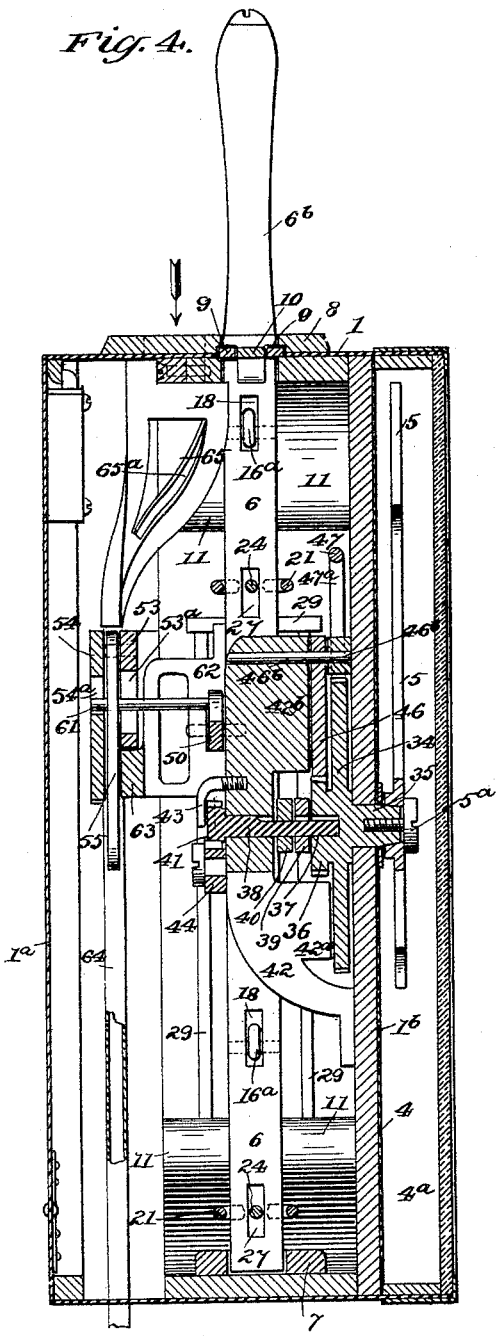
Figure 5:
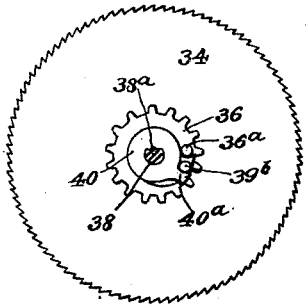
Figure 6:
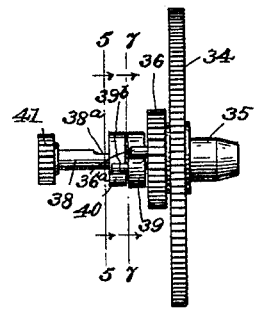
Figure 7:
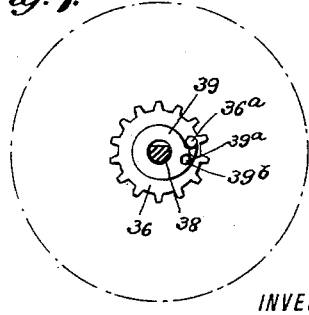

Figure 1 is a front elevation of the machine embodying my invention, showing the case mounted upon a suitable stand or pedestal. Fig. 2 is an enlarged rear elevation of the case containing the operating mechanism with the cover removed to show said mechanism and with the main handle-levers in normal position. Fig. 3 is a rear elevation with the coin-chute and latch and the cross-band removed, the handle-levers being partially pressed together. Fig. 4 is a vertical transverse section on the line 4 4 of Fig. 2. Fig. 5 is a cross-section on the line 5 5 of Fig. 6, showing a portion of the gear mechanism for operating the indicating-hand. Fig. 6 is a detailed side elevation of the gear mechanism for operating the indicating-hand. Fig. 7 is a transverse section on the line 7 7 of Fig. 6. Fig. 8 is a broken rear elevation, showing the coin-channel and the sliding bar and coin-latch connecting with the handle-levers, the said bar and latch being in position to receive a coin. Fig. 9 is a view of the same parts, but showing the position of the sliding bar and coin-latch when the handle-levers are forced toward each other. Fig. 10 is a detailed perspective view of the coin-chute. Fig. 11 is a plan view of the handle-levers and the followers connected therewith for closing the slot in the top of the case. Fig. 12 is a broken longitudinal section of the same on the line 12 12 of Fig. 11. Fig. 13 is a broken sectional rear elevation showing the connection between the locking-latch and one of the handle-levers, and also showing the mechanism for releasing the pawl of the main ratchet-wheel, the section being taken on line 13 13 in Fig. 14. Fig. 14 is a vertical section of the same on the line 14 14 of Fig. 13; and Fig. 15 is a vertical cross-section through the main case on the line 15 15 of Fig. 2.

The case 1 is hollow, and is large enough to contain the mechanism of the machine, the case being mounted upon a suitable stand or pedestal 2, and a money-box 3, of any desired construction, is interposed between the stand and the case 1, so that the coins which are dropped into the machine may be conducted to the money-box and removed at pleasure. The case 1 has a suitable lid or cover 1ª hinged to its back, and has a vertical front partition 1ᵇ, which has a dial 4 on its outer side, and a space 4ª is formed on the front of the case in which the indicating-hand 5 moves, the said space 4ª being covered by a glass to protect the hand from the weather. A pair of levers 6 extend vertically through the case, the levers being bent outwardly at the points 6ª to accommodate the inner mechanism of the case and the lower ends of the levers move in the slideway 7 in the bottom of the case, the upper ends projecting through a slot in the top of the case and having suitable handles 6ᵇ, attached to their upper ends in such a manner that the handles may turn upon the levers. A plate 8 is fixed to the top of the case and is correspondingly slotted, through which slot the main levers extend, the said plate having a slideway $8^a$ at each side of its slot. One of the levers 6 has a bifurcated follower 9 yoked thereto, said follower moving in the slideways $8^a$ and passing on each side of the opposite lever, and the other lever is provided with followers 10 and $10^a$, which move between the members of the follower 9 and the follower 10, passing through a slot $6^c$ in the opposite lever, so that as said levers are pressed together the followers 9, 10, and $10^a$ will cover the slot in the top of the case, and thereby prevent sticks, stones, and other matter from being passed through the slot into the machine.

Fixed in the four corners of the case are the hangers 11, which are arranged in pairs and extend diagonally inward, and pivoted between the said hangers are the angle-levers 12 and $12^a$, the levers 12 being pivoted between the upper hangers and the levers $12^a$ being pivoted between the lower hangers. The upper and lower angle-levers are substantially alike, the only difference being that the straight arms of the upper levers are provided with a hook at each end and the straight arms of the lower levers have hooks at one end only. The angle-levers 12 and $12^a$ are each provided with a straight arm 13, having hooks $13^a$ at the ends and extending centrally from said straight arm is the bent arm 14, having a hook $14^a$ at the end, and the levers are pivoted between the hangers 11 on the pins 15, which extend through the elbows of the bent arms 14. The angle-levers are connected in such a manner that the straight arms of the lower levers will be normally in a horizontal position, as shown in Fig. 2, and the straight arms of the upper levers will be in a nearly vertical position, as shown in the same figure. The bent arms of the lower angle-levers and the upper ends of the straight arms of the upper angle-levers are connected with the handle-levers 6 by the rods 16, the said rods having hooks $16^a$ at the ends next the handle-levers to extend into the vertical slots 18 of the handle-levers and engage the pins 17 in said slots, and the outer ends of the rods 16 are provided with adjustable saddles 19, having transverse pins 20 therein, which are adapted to engage the hooks in the angle-levers, the bent arms of the upper angle-levers and the inner ends of the straight arms of the lower angle-levers on one side of the case being connected with the handle-levers on the opposite side of the case by the yokes 21 and rods 24. The yokes 21 extend through one of the levers 6 and inclose the opposite lever, and the ends of the yokes are provided with saddles 22, having transverse rods 23 therein, which engage the hooks of the angle-levers. The rods 24 are provided at one end with saddles 25, having transverse pins 26 therein to engage the hooks of the angle-levers, and the rods extend through slots 27 in the lever 6 next the swivel end of the rods, and the opposite ends of the rods are provided with suitable hooks, which engage pins 28, extending through slots in the opposite handle-lever. The position of the slots and pins to which the rods 24 are hooked is indicated by dotted lines in Figs. 2 and 3. The angle-levers 12 and $12^a$ at the upper and lower portions of the case, respectively, are connected by yokes 29, said yokes having saddles 30 at each end, the lower saddles being pivoted to the outer ends of the straight arms of the lower levers, and the upper saddles being hooked to the lower ends of the straight arms of the upper angle-levers. In the upper ends of the yokes 29 are depending hooks 31, which are connected by the springs 32 with the hooks 33, which are fixed to the sides of the case near the lower part thereof. The strength of the springs is sufficient to offer considerable resistance to the operation of the levers 6, and when the levers are pressed together, thus expanding the springs, the amount of resistance in pounds is expressed on the dial of the machine, as hereinafter described. From the foregoing description of the manner in which the main levers are connected it will be seen that the upper and lower parts of the levers will move the same distance and at the same rate of speed, and consequently the handles $6^b$ of the levers will move toward each other in a perfectly parallel position.

A large ratchet-wheel 34 is centrally pivoted on the front partition $1^b$ of the case 1, the said ratchet-wheel having a spindle 35, which projects through the partition, and is adapted to carry the indicating-hand 5, the said spindle being tapering, so that the hand may be easily adjusted thereon, the hand being held to the spindle by a screw $5^a$, and the inner end of the ratchet-wheel hub has a pinion 36 formed thereon. In the rear end of the ratchet-wheel hub is a horizontal recess 37, in which turns loosely the shaft 38. The shaft 38 is flattened on one side, as shown, and is provided with a pawl 39, which turns loosely thereon and is arranged next the pinion 36 of the ratchet-wheel, and on one edge of the pawl is a projecting-shoulder $39^a$, which engages a laterally-extending pin $36^a$ on the ratchet-pinion 36. The pawl 39 is also provided with a laterally-extending pin $39^b$, which is arranged adjacent to the shoulder $39^a$ and is adapted to engage the radially-extending arm or shoulder $40^a$ on the pawl 40, said pawl being fixed to the shaft 38 adjacent to the pawl 39. The rear end of the shaft 38 is provided with a pinion 41, and the shaft is supported in a suitable bracket 42, the bracket being fixed to the front partition $1^b$ of the case, so as to extend upwardly, and the said bracket is provided with a thickened portion $42^a$, adapted to serve as a guide for the ratchet-wheel 34, and with a thickened portion $42^b$ near its upper end, which serves as a guide for the segmental rack, as described below.

The shaft 38 is held in position and prevented from moving laterally by a keeper 43, which is screwed into the bracket 42, the end of the keeper being bent downward so as to come opposite the rear end of the shaft. The handle-levers 6 are connected by a rack 44, which extends horizontally from lever to lever and is attached thereto by the screws 45, one end of the rack having a longitudinal slot 44$^a$ therein, so that the rack may slide on one of the screws 45. The teeth on the upper edge of the rack mesh with the pinion 41 on the end of the shaft 38, so that when the levers are forced together the rack 44 will move horizontally and will turn the pinion 41 and shaft 38, and as the shaft turns the fixed pawl 40 engages the stud on the loose pawl 39, and that in turn engages the stud on the ratchet-pinion 36, thus turning the said pinion and the ratchet-wheel 34 and the spindle 35, and thereby causing the hand 5 to be turned and to indicate upon the dial the amount of pressure upon the levers; and it will be observed that the strength of the springs 32 should be such that a pressure of one pound upon the levers 6 will cause the hand 5 to be moved sufficiently to indicate one pound upon the dial, and the dial may be arranged in such a manner as to indicate larger or smaller amounts of weight, as desired.

A segmental rack 46 is pivoted on the shaft 46$^b$ above the pinion 36, so that the teeth on the lower edge of the rack will mesh with said pinion, and extending from one end of the rack 46 is a counter-balance 46$^a$. The counter-balance and rack are arranged in such a manner that when the levers 6 are pressed together, as described above, thus turning the hand 5 to indicate the amount of pressure upon the levers, the pinion 36 will actuate the rack and raise the counter-balance 46$^a$, and when the pressure is removed from the levers and the pawl is disengaged from the ratchet-wheel 34, as described below, the counter-balance 46$^a$ will drop, thus moving the rack and the pinion 36 in the opposite direction and causing the hand 5 to return to its normal position. A pawl 47 is pivoted above the ratchet-wheel 34, the said pawl having two depending arms 47$^a$ and 47$^b$, the lower end of the arm 47$^a$ being arranged to engage the teeth of the ratchet-wheel 34 and prevent it from turning backward and the lower end of the arm 47$^b$ being bent at right angles to said arm, as shown at 47$^c$. The pawl 47 is hung in such a manner that it nearly balances, but will normally engage the teeth of the ratchet-wheel. A latch 48 is attached to one of the levers 6 adjacent to the arm 47$^b$ of the pawl 47, the said latch being attached in such a manner that it may slide slightly in a vertical direction, and the lower end of the latch is bent at right angles and is provided with a shoulder 48$^a$, which normally engages the bent end 47$^c$ of the pawl 47.

It will be seen that when the levers 6 are pressed together the number of pounds pressure will be registered by the hand 5, as described, and the pawl 47 will engage the ratchet-wheel 34, and thus hold the hand in position after the pressure is removed from the levers. To release the pawl and cause the hand to return to its normal position, the levers 6 are pushed slightly toward each other, and the shoulder 48$^a$, engaging the bent end 47$^c$ of the pawl, causes the pawl to be raised from the ratchet-wheel, so that the weighted rack will return the ratchet-wheel and hand to its normal position; but as the levers 6 are in operating them moved still further toward each other the latch 48 rides over the bent end 47$^c$ of the pawl and the pawl drops to its normal position in engagement with the ratchet-wheel.

A block 49 is fixed to the partition 1$^b$ opposite the arm 47$^b$ of the pawl 47, and the said block serves as a guide to hold the arm in position for its bent end 47$^c$ to engage the latch 48. One of the levers 6 has a latch 50 pivoted thereto, and the said latch extends horizontally across the opposite lever 6, being inclosed by a bracket 51, the said bracket having a shoulder 52 thereon, and the length of the latch is such that when the levers 6 are apart and in the normal position the end of the latch drops into engagement with the shoulder 52, thus locking the levers so that they cannot be forced together.

A band 53 extends horizontally across the rear portion of the case opposite the latch 50, the said band having a horizontal slot 53$^a$ therein, and having shoulders 53$^b$ on its lower side to limit the movement of the sliding bar, as described below. A horizontal strip 54 is fixed to the rear portion of the band 53, said strip having a horizontal slot 54$^a$ therein, and suitable pieces 53$^c$ are interposed between the band 53 and the strip 54, so as to form a vertical slot between the two, and in this slot or space the coin-latch 55 is pivoted, the said latch being pivoted on a stud 56. The coin-latch 55 is straight upon one edge, except for a slight projection 55$^a$ near the lower part thereof, which is adapted to engage and support a coin, and near the upper portion of the latch is a curved slot 57, which incloses a stud 58 on the band 53 and serves as a guide for the latch. The latch is also provided with a depending portion 59, having a longitudinal slot 60 therein, and the upper end 60$^a$ of said slot extends at an angle to the main portion of the slot and is adapted to receive the rod 61 when the machine is locked. The rod 61 is fixed to the raised portion 50$^a$ of the latch 50 and extends laterally from said latch through the slot 53$^a$ in the band 53, the slot 60 in the latch 55, and the slot 54$^a$ in the strip 54, the slots 53$^a$ and 54$^a$ thus allowing for the movement of the rod.

One of the levers 6, to which the latch 50 is pivoted, is provided with a laterally-extending bracket 62, carrying a horizontal check-bar 63, which moves on the lower side of the band 53 and between the shoulders 53$^b$ of the band, the said sliding bar having on its rear side a shoulder 63ᵃ, which is opposite the projection 55ᵃ on the coin-latch, and a coin dropped into the channel formed between the coin-latch 55 and one of the pieces 53ᶜ will thus fall into position between the shoulder 63ᵃ on the bar 63 and the projection 55ᵃ on the coin-latch. The coin-latch 55 normally rests in a nearly vertical position, as shown in Fig. 8, with the rod 61, resting in the angle portion 60ᵃ of the slot 60, so that the coin-latch and the locking-latch 50 cannot be operated, and consequently the levers 6 cannot be pressed together; but when a coin is dropped between the projection 55ᵃ and the shoulder 63ᵃ on the check-bar 63, as indicated by dotted lines in Fig. 8, and the levers 6 are pressed together the shoulder 53ᵃ forces the coin against the lower portion of the coin-latch, thus swinging the latch upwardly and causing the rod 61 to slide in the slot 60, and the upward movement of the latch raises the rod, and consequently raises the latch 50, thus releasing the end of said latch from the shoulder 52 in the bracket 51, and the levers may be operated and the strength of one's grip will be indicated by the hand 5 on the dial by means of the gear mechanism connecting the levers and hand, as described above. When the coin-latch is raised, as described, the coin drops from between the coin-latch and the sliding bar, and a suitable chute 64 is arranged below said parts to receive the coin and conduct it to the money-box 3. A coin-chute 65 delivers between the said coin-latch and check-bar 63, the said chute having slideways 65ᵃ, in which a coin may slide, and fixed to the upper end of the chute is a slotted piece 66, having a vertical slot 66ᵃ to receive the coin, said slot aligning with the slideway of the chute 65, and the said piece 66 has suitable lugs 66ᵇ, by means of which it may be attached to the case 1. The coin-chute is twisted, as best shown in Fig. 10, and is provided with openings 67, one of said openings being arranged to come directly beneath the slot 66ᵃ, so that if small articles are dropped into the slot they will fall through the opening 67 and will not clog the machine. It will be observed that if the coin dropped in the slot is too small it will pass between the projection 55ᵃ on the coin-latch and the shoulder 63ᵃ on the check-bar 63 without effecting the operation of the machine.

To operate the machine, a coin is dropped into the coin-chute and comes to rest between the coin-latch and the shoulder 63ᵃ on the check-bar 63. The operator then presses the handles 6ᵇ at the top of the levers 6 together, thus unlocking the machine, and the movement of the levers turns the gear mechanism and indicating-hand 5 in the manner described. It will be observed that the distance the hand is moved corresponds with the distance the levers are moved toward each other, and it is obvious that this distance will be regulated by the strength of one's grip, and consequently the strength of the grip will be indicated upon the dial of the machine.

Having thus fully described my invention, I claim as new and desire to secure by Letters Patent—

1. In a grip-machine, the combination of two handle-levers bodily and parallelly movable toward and from each other, and a registering device connected with and operated by said levers, substantially as described.

2. In a grip-machine, the combination of two parallel handle-levers held to have a sidewise movement bodily in parallel relation, and coin-controlled mechanism for setting the levers, substantially as described.

3. A grip-testing machine comprising a dial, an indicating-hand, a pair of spring-pressed parallel levers arranged to move bodily, as described, and a gear mechanism connecting the levers with the indicating-hand.

4. A grip-testing machine comprising a dial, an indicating-hand arranged to move thereon, a pair of spring-pressed levers arranged to move bodily, as described, a gear mechanism connecting the levers with the hand, a pawl to prevent the backward movement of the gear mechanism, and a device to release the pawl, substantially as described.

5. The combination, with the main handle-levers, of a latch for automatically locking the levers, a bracket fixed to one lever and having a shoulder to engage the latch, and coin-operating mechanism for raising the latch, substantially as described.

6. A grip-testing machine comprising a case or frame, a pair of parallel levers mounted to move bodily therein, as described, springs fixed to the sides of the case, a lever mechanism connecting the springs with the handle levers, a suitable dial and indicating-hand, and a gear mechanism connecting the hand and levers, substantially as described.

7. In a grip-testing machine, the combination, with the case and the handle-levers, of the angled levers pivoted in the four corners of the case, yokes and rods, substantially as described, connecting the angled levers with the handle-levers, connections between the upper and lower angled levers, and springs connecting at one end with the case and at the other end with the angled levers, substantially as described.

8. A grip-testing machine comprising a dial, a ratchet-wheel having a spindle extending through the dial to carry a hand, a pinion fixed to the ratchet-wheel hub and provided with a laterally-extending stud, a pawl for the ratchet-wheel, a shaft having one end mounted loosely in the ratchet-wheel and the other end provided with a pinion, a pawl mounted loosely on the shaft and provided with a shoulder to engage the stud of the ratchet-pinion and with a laterally-extending stud, a pawl fixed to the shaft and having a shoulder to engage the stud of the loose pawl, a pair of spring-pressed handle-levers placed perpendicular to the shaft, and a slotted rack fixed to one of the levers and adapted to engage the pinion on the end of the shaft, substantially as described.

9. In a grip-testing machine, the combination, with the main ratchet-wheel having on one side a hand-carrying spindle and on the other a pinion having a laterally-extending stud, of the revoluble shaft having one end loosely mounted in the ratchet-wheel hub, a pawl mounted loosely on the shaft, having a shoulder to engage the pinion-stud and a laterally-extending stud, and a pawl fixed to the shaft and provided with a shoulder to engage the stud of the loose pawl, substantially as described.

10. In a grip-testing machine, the combination, with the main ratchet-wheel having on one side a hand-carrying spindle and on the opposite side a pinion and a gear mechanism for turning the ratchet-wheel in one direction, of the segmental rack meshing with the ratchet-pinion and provided with a counter-balance on one end, substantially as described.

11. The combination, with the main ratchet-wheel having on one side a hand-carrying spindle, the main handle-levers connecting with the ratchet-wheel by a gear mechanism, and a weight-operated gear mechanism for turning the ratchet-wheel in opposition to the lever-gearing, of a pawl for the ratchet-wheel and a releasing device attached to one of the main levers and adapted to release the pawl by a movement of the lever, substantially as described.

12. The combination, with the main ratchet-wheel having a hand-carrying spindle and having means, as shown, for alternately turning it in opposite directions, and the main handle-levers, of a pawl pivoted above the ratchet-wheel and provided with depending arms, one of which is adapted to engage the ratchet-wheel and the other of which is bent at the end, and the latch loosely attached to one of the levers, said latch having a shoulder on its under side to engage the bent end of the pawl, substantially as described.

13. In a grip-testing machine, the combination, with the handle-levers and the locking-latch thereon, of a coin-channel, a latch pivoted on one side of the channel and adapted to engage a coin, a check-bar on the opposite side of the channel, a rigid connection between one of the handle-levers and the check-bar, and a connection between the locking-latch and the coin-latch, substantially as described.

14. In a grip-testing machine, the combination, with the handle-levers, and the locking-latch thereon, of a coin-channel, a check-bar on one side of the channel, said bar having a rigid connection with one of the handle-levers, a coin-latch pivoted on the opposite side of the coin-channel and adapted to engage a coin, a guide for the latch, and a rod fixed to the locking-latch and extending through a slot in the coin-latch, substantially as described.

15. In a grip-testing machine, the combination, with spring-actuated levers, of handle-levers connected with said spring-levers to move bodily toward one another, substantially as described.

16. In a grip-testing machine, the combination, with spring-actuated levers, of handle-levers connected with said spring-levers to move bodily toward one another, an indicating-hand, and a gear mechanism connecting said handle-levers and hand, substantially as described.

17. In a grip-testing machine, the combination, with spring-actuated levers, of handle-levers connected with said spring-levers to move bodily toward one another, an indicating-hand, a gear mechanism connecting said handle-levers and hand, and a coin-operated lock for said handle-levers, substantially as described.

18. In a grip-testing machine, the combination, with spring-actuated levers, of handle-levers connected with said spring-levers to move bodily toward one another, an indicating-hand, a gear mechanism connecting said handle-levers and hand, a coin-operated lock for said handle-levers, a ratchet-wheel connected with the gear mechanism, a pawl engaging said ratchet-wheel, and a latch on one of the handle-levers for holding and releasing said pawl, substantially as described.

19. In a grip-testing machine, the combination, with the case and the handle-levers extending through a slot in the top of the case, of followers fixed to the handle-levers and adapted to close the slot, substantially as described.

THEOBALD E. J. SCHAIBLY.

Witnesses:
WARREN B. HUTCHINSON,
C. SEDGWICK.